US011869712B2

(12) United States Patent
Horiuchi et al.

(10) Patent No.: US 11,869,712 B2
(45) Date of Patent: Jan. 9, 2024

(54) ELECTROMAGNETIC SOLENOID AND METHOD FOR MANUFACTURING ELECTROMAGNETIC SOLENOID

(71) Applicant: SANYO DENKI CO., LTD., Tokyo (JP)

(72) Inventors: Manabu Horiuchi, Tokyo (JP); Keisuke Nagata, Tokyo (JP); Rie Matsuyama, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 4 days.

(21) Appl. No.: 17/687,207

(22) Filed: Mar. 4, 2022

(65) Prior Publication Data

US 2022/0293321 A1 Sep. 15, 2022

(30) Foreign Application Priority Data

Mar. 15, 2021 (JP) ................................. 2021-041047

(51) Int. Cl.

*H01F 41/02* (2006.01)
*H01F 7/08* (2006.01)
*H01F 7/16* (2006.01)

(52) U.S. Cl.

CPC ........... *H01F 7/088* (2013.01); *H01F 7/1638* (2013.01); *H01F 41/02* (2013.01)

(58) Field of Classification Search

CPC ........ H01F 7/088; H01F 7/1638; H01F 41/02; H01F 7/127; H01F 7/13; H01F 7/081; H01F 7/16; H01F 7/08; H01F 1/12

(Continued)

(56) References Cited

U.S. PATENT DOCUMENTS

2004/0085169 A1* 5/2004 Matsusaka ......... G05D 16/2024 335/220
2006/0138648 A1* 6/2006 Baek ....................... H01L 24/97 257/E25.023

(Continued)

FOREIGN PATENT DOCUMENTS

JP 11-135321 A 5/1999

OTHER PUBLICATIONS

European Search Report (EESR) dated Aug. 17, 2022 for European Patent Application No. 22160068.7.

*Primary Examiner* — Shawki S Ismail
*Assistant Examiner* — Lisa N Homza
(74) *Attorney, Agent, or Firm* — RANKIN, HILL & CLARK LLP

(57) ABSTRACT

There is provided an electromagnetic solenoid including: a stator including a stator core; a coil configured to generate an electromagnetic attractive force by energizing the stator core; a mover configured to be attracted toward the stator by the electromagnetic attractive force; and a magnetic elastic admixture including a resin material with soft magnetism and elasticity, wherein the mover is configured to be capable of reciprocating by being released by an elastic body that generates a biasing force in a direction opposite to a direction in which the electromagnetic attractive force acts, a proximal end of the mover is located at a first proximal end position upon the mover being electromagnetically attracted toward the stator during energization of the coil, and is located at a second proximal end position upon the mover being electromagnetically released and moved to a side opposite to the stator during de-energization of the coil, and the magnetic elastic admixture is configured to elastically deform between the mover and the stator and not to be (Continued)

separated from a contact surface with the mover and a contact surface with the stator.

6 Claims, 4 Drawing Sheets

(58) Field of Classification Search
USPC .......................................................... 335/257
See application file for complete search history.

(56) References Cited

U.S. PATENT DOCUMENTS

| | | | | |
|---|---|---|---|---|
| 2012/0020117 | A1* | 1/2012 | Arnold | H01F 5/00<br>310/25 |
| 2014/0026836 | A1* | 1/2014 | Matsumoto | H02K 41/02<br>123/90.15 |
| 2015/0033546 | A1* | 2/2015 | Uchida | H01J 37/30<br>335/219 |
| 2015/0234297 | A1* | 8/2015 | Akkermans | G03F 7/22<br>318/135 |
| 2016/0104562 | A1* | 4/2016 | Doljack | H01F 7/081<br>29/606 |
| 2016/0336101 | A1* | 11/2016 | Ito | H02K 41/031 |
| 2018/0135579 | A1* | 5/2018 | Kusakabe | F02M 59/466 |
| 2018/0145548 | A1* | 5/2018 | Hashimoto | H02K 41/031 |
| 2019/0221392 | A1 | 7/2019 | Nishiguchi et al. | |
| 2020/0251267 | A1 | 8/2020 | Ozika et al. | |

* cited by examiner

ELECTROMAGNETIC SOLENOID AND METHOD FOR MANUFACTURING ELECTROMAGNETIC SOLENOID

CROSS-REFERENCE TO RELATED APPLICATION

This application is based on Japanese Patent Application No. 2021-041047 filed with the Japan Patent Office on Mar. 15, 2021, the entire content of which is hereby incorporated by reference.

BACKGROUND

1. Technical Field

The present disclosure relates to an electromagnetic solenoid and a method for manufacturing the electromagnetic solenoid.

2. Related Art

A technology for improving the characteristics of the electromagnetic force of attraction of an electromagnetic solenoid and improving mechanical characteristics thereof is being desired. In terms of an electromagnetic solenoid including a stator and a mover, for example, a technology described in JP-A-11-135321 is known.

The electromagnetic solenoid described in JP-A-11-135321 includes a coil, a stator core (stator) that controls magnetization with an excitation current flowing through the coil, and a mover that faces the stator and is magnetically attracted by the stator and moves toward the stator. Furthermore, an elastic body that biases the stator and the mover in a release direction against the electromagnetic force of attraction between the stator and the mover moves the mover in a direction away from the stator. In the electromagnetic solenoid where the mover can reciprocate between the mover and the stator on the basis of the presence or absence of power applied to the coil of the electromagnetic solenoid, a cushioning material made of magnetic rubber as a magnetic member is placed close to the stator between opposing contact surfaces of the stator and the mover.

The cushioning material has the characteristics of both of the cushioning material and the magnetic material. The magnetic permeability can be increased several to several tens of times depending on the magnetic characteristics and amount of a magnetic powder included in the cushioning material. In addition, the hardness of the cushioning material can also be adjusted. Hence, an impact between the stator and the mover caused by attraction between the stator and the mover can be mitigated. Moreover, the magnetic rubber can maintain a magnetic path of magnetic flux. Hence, magnetic reluctance can be reduced. Moreover, the magnitude of decrease in the electromagnetic force of attraction can be reduced.

SUMMARY

An electromagnetic solenoid according to the present embodiment includes: a stator including a stator core; a coil configured to generate an electromagnetic attractive force by energizing the stator core; a mover configured to be attracted toward the stator by the electromagnetic attractive force; and a magnetic elastic admixture including a resin material with soft magnetism and elasticity. The mover is configured to be capable of reciprocating by being released by an elastic body that generates a biasing force in a direction opposite to a direction in which the electromagnetic attractive force acts. A proximal end of the mover is located at a first proximal end position upon the mover being electromagnetically attracted toward the stator during energization of the coil, and is located at a second proximal end position upon the mover being electromagnetically released and moved to a side opposite to the stator during de-energization of the coil. The magnetic elastic admixture is configured to elastically deform between the mover and the stator and not to be separated from a contact surface with the mover and a contact surface with the stator.

DETAILED DESCRIPTION

Figure 1:
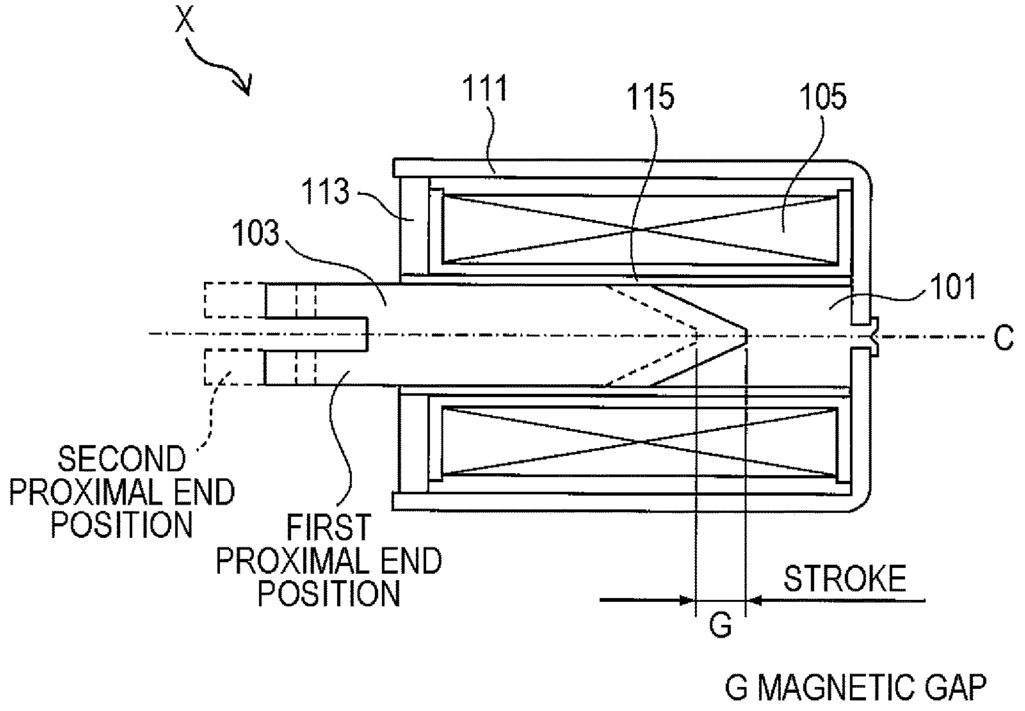
FIG. 1 is a cross-sectional view including an axis C, which illustrates an example of the configuration of an electromagnetic solenoid according to the embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The electromagnetic solenoid (hereinafter referred to as the "standard electromagnetic solenoid X") of JP-A-11-135321 has the following problem.

FIG. 1 is a cross-sectional view illustrating a basic structure of the standard electromagnetic solenoid X including a mover. As illustrated in FIG. 1, the electromagnetic solenoid X includes three elements as the basic structure that generates an electromagnetic force: a stator core 101; a coil 105 that generates an electromagnetic attractive force on the stator core 101; and a mover 103 that can reciprocate between the stator core 101 and an elastic body such as a spring. The mover is configured in such a manner as to be magnetically attracted toward the stator core 101, and released by the elastic body that biases a force in a direction opposite to a direction in which the electromagnetic attractive force acts. These elements are enclosed and held by structures such as a frame 111, a front frame 113, and a guide pipe 115. The frame 111 covers substantially the entire solenoid excluding a surface from which the mover 103 juts. The front frame 113 blocks the surface from which the mover 103 juts, except a hole that the mover 103 goes through. The guide pipe 115 can house the stator core 101 fixed to a side surface of the frame 111, which is opposite to the front frame 113, and a part of the mover 103 that reciprocates.

At this point in time, the shape of a portion facing the mover and the stator, which defines an air gap (hereinafter referred to as the "magnetic gap G") between the mover and the stator is referred to below as the "magnetic gap forming shape." Moreover, the magnetic gap forming shape is represented by the shape of a distal end of the mover 103 on the stator core 101 side. It is generally known that the characteristics of the electromagnetic attractive force relative to the stroke of the mover 103 change depending on the magnetic gap forming shape. The inside of the magnetic gap G is handled as a gas layer such as air in terms of electromagnetism.

Figure 2:
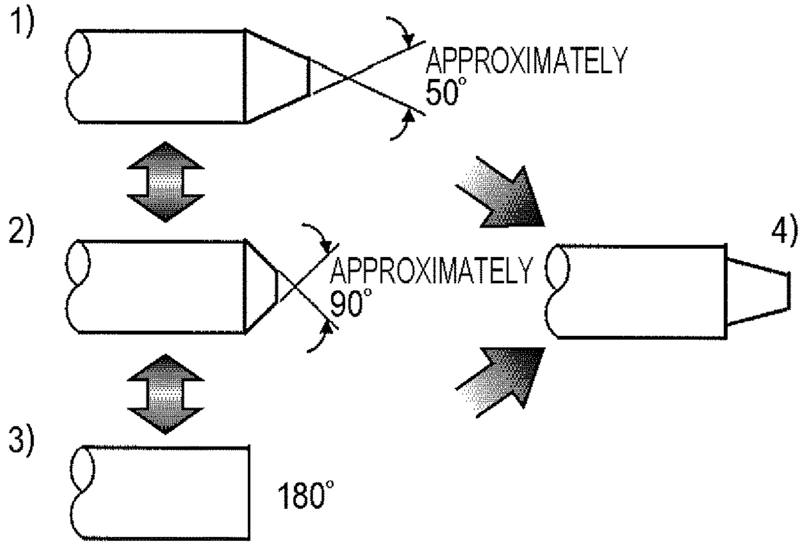
FIG. 2 is a cross-sectional view as viewed in the same direction as FIG. 1, which illustrates examples of a magnetic gap forming shape of the electromagnetic solenoid according to the embodiment.
Figure 3:
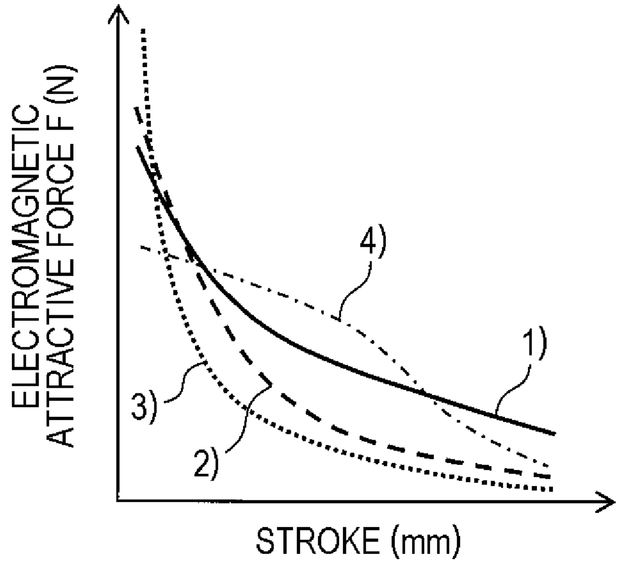
FIG. 3 is a schematic diagram illustrating the stroke dependence of an electromagnetic attractive force F of each magnetic gap forming shape in FIG. 2.

FIG. 2 is a diagram illustrating various examples of the above-mentioned magnetic gap forming shape of the standard electromagnetic solenoid X. FIG. 3 is a diagram illustrating the stroke dependence of the magnetic attractive force of the electromagnetic solenoid. FIG. 3 illustrates the characteristics of the electromagnetic attractive force of each magnetic gap forming shape illustrated in FIG. 2.

Four examples 1) to 4) of the magnetic gap forming shape illustrated in FIG. 2 are described. In 1) in FIG. 2, the magnetic gap forming shape is a tapered truncated conical shape. The angle of the apex is an acute angle, that is, approximately 50 degrees. In 2) in FIG. 2, the magnetic gap forming shape is similar to 1), but the angle of the apex is an obtuser angle, that is, approximately 90 degrees. In 3) in FIG. 2, the magnetic gap forming shape is a flat shape (the apex may be considered to be 180 degrees). 4) in FIG. 2 illustrates a hybrid shape of the truncated conical shape of, for example, 1) or 2) and the flat shape of 3). However, the bottom surface of the truncated conical shape has a shorter diameter than 1) or 2).

As it can be seen from FIG. 3, the characteristics of the electromagnetic attractive force relative to the stroke vary depending on the magnetic gap forming shapes in the standard electromagnetic solenoid X, which are illustrated in 1) to 4) in FIG. 2.

It is shown that the characteristics are exhibited where if the magnetic gap forming shape is a flat shape as in 3) in FIG. 2, the electromagnetic attractive force is largest at a considerably short stroke distance as illustrated with a curve in 3) in FIG. 3 while the electromagnetic attractive force decreases sharply and geometrically with increasing stroke distance.

Moreover, if the angle of the apex of the magnetic gap forming shape of the electromagnetic solenoid is an acute angle as in 1) in FIG. 2, the electromagnetic attractive force is smaller than 3) in FIG. 2 at a short stroke distance. However, it is shown that even if the stroke distance increases, the rate of decrease (decreasing rate) in the electromagnetic attractive force is relatively small.

In this manner, the electromagnetic attractive force based on the stroke of the electromagnetic solenoid is dependent on the magnetic gap forming shape. In other words, it is shown that the magnitude of the electromagnetic attractive force at a short stroke distance, and the decreasing rate of the electromagnetic attractive force that decreases with increasing stroke distance are in a trade-off relationship.

The hybrid shape (which can also be said as an intermediate shape) as in 4) in FIG. 2, which is a combination of the shape in 1) or 2) and the shape in 3), has a relatively small influence on the decreasing rate of the electromagnetic attractive force based on the stroke.

In this manner, a variety of the magnetic gap forming shapes enable the adjustment of the relationship between the stroke and the electromagnetic attractive force to some degree. However, the adjustment requires complicated mechanical processing on the mover and the stator to configure a desired magnetic gap forming shape. Hence, there is a limit to the effect of this technique.

An object of the embodiment is to provide: an electromagnetic solenoid that makes the above-mentioned sharp decrease in the electromagnetic attractive force based on the stroke distance as gentle as possible, improves mechanical characteristics such as responsivity in a release direction, and includes a stator and a mover that are easily machined; and a method for manufacturing the electromagnetic solenoid.

In order to solve the above problem, an electromagnetic solenoid according to the present embodiment includes: a stator including a stator core; a coil configured to generate an electromagnetic attractive force by energizing the stator core; a mover configured to be attracted toward the stator by the electromagnetic attractive force; and a magnetic elastic admixture including a resin material with soft magnetism and elasticity, the mover is configured to be capable of reciprocating by being released by an elastic body that generates a biasing force in a direction opposite to a direction in which the electromagnetic attractive force acts, a proximal end of the mover is located at a first proximal end position upon the mover being electromagnetically attracted toward the stator during energization of the coil, and is located at a second proximal end position upon the mover being electromagnetically released and moved to a side opposite to the stator during de-energization of the coil, and the magnetic elastic admixture is configured to elastically deform between the mover and the stator and not to be separated from (that is, in such a manner as to be always connected to) a contact surface with the mover and a contact surface with the stator.

Preferably, the magnetic elastic admixture includes a soft magnetic elastic admixture having a resin binder with elasticity and a soft magnetic powder, which are mixed or kneaded in a resin material.

Preferably, the stator has an annular shape, and the mover has an annular shape and also a plate shape.

Preferably, the elastic body that generates the biasing force includes a coil spring, a Belleville washer, or a bulk elastic material.

Moreover, a method for manufacturing an electromagnetic solenoid according to the present embodiment includes forming a magnetic elastic admixture. The electromagnetic solenoid includes: a stator including a stator core; a coil configured to generate an electromagnetic attractive force by energizing the stator core; a mover configured to be attracted toward the stator by the electromagnetic attractive force; and the magnetic elastic admixture including a resin material with soft magnetism and elasticity. The mover is configured to be capable of reciprocating by being released by an elastic body that generates a biasing force in a direction opposite to a direction in which the electromagnetic attractive force acts. A proximal end of the mover is located at a first proximal end position upon the mover being electromagnetically attracted toward the stator during energization of the coil, and is located at a second proximal end position upon the mover being electromagnetically released and moved to a side opposite to the stator during de-energization of the coil. The magnetic elastic admixture is held between the mover and the stator in such a manner as to be always in contact with a contact surface with the mover and a contact surface with the stator. The forming of the magnetic elastic admixture includes: mixing a magnetic powder in a resin with a high degree of hardness, and a rubber-like resin with a low degree of hardness; and two-color molding with the resins.

Preferably, the rubber-like resin with the low degree of hardness is a resin binder with elasticity, and the magnetic powder is a soft magnetic powder.

Other embodiments of the present disclosure are evident from a description of an embodiment described below.

The electromagnetic solenoid according to the embodiment can obtain the following effects: The configuration of the electromagnetic solenoid described above is employed to decrease magnetic resistance across the entire stroke region of the electromagnetic solenoid. Hence, the characteristics of the electromagnetic attractive force can be improved. Moreover, the mechanical characteristics can be improved by the biasing force of the magnetic elastic admixture. Furthermore, mechanical processing can be simplified.

Other effects of the embodiment will become clear in the detailed description of the embodiment, which is given below.

In the present disclosure, unless otherwise noted, a stator core 1 may be referred to as a stator depending on the situation. Moreover, in the present disclosure, a position at a proximal end of a mover that is electromagnetically attracted toward the stator when a coil is energized is referred to as the "first proximal end position." Moreover, a position at the proximal end of the mover that is on a side opposite to the stator when the coil is de-energized and the coil is electromagnetically released (biased by an elastic force) is referred to as the "second proximal end position."

The embodiment is described in detail with reference to the accompanying drawings. Firstly, the outline of the embodiment is described.

An electromagnetic solenoid A itself is known and therefore is not described in detail. As mentioned above, examples of the electromagnetic solenoid A include an electromagnetic solenoid including three elements as a basic structure: a stator core; a coil that generates an electromagnetic attractive force F on the stator core; and a mover that can reciprocate between the stator core and an elastic body. In this case, the mover is configured in such a manner as to be magnetically attracted by the stator core, be released by the elastic body that biases a force in a direction opposite to a direction in which the electromagnetic attractive force F acts, and maintain the released state. These elements are enclosed and held by structures such as a frame, a front frame, and a guide pipe. The frame covers substantially the entire solenoid excluding a surface from which the mover juts. The front frame blocks the surface from which the mover juts, except a hole that the mover goes through. The guide pipe can house a stator fixed on a side surface of the frame, which is opposite to the front frame, and a part of the mover that reciprocates. As mentioned above, for convenience's sake, the embodiment is described below, referring to the stator core as the stator.

The electromagnetic solenoid A includes a magnetic gap G between the stator and the mover. The magnetic gap G substantially restricts the stroke of a mover 11 of the electromagnetic solenoid A.

Moreover, as mentioned above, the relationship between the stroke and the electromagnetic attractive force F of the electromagnetic solenoid is dependent on the magnetic gap forming shape. The magnitude of the electromagnetic attractive force F at a short stroke distance, and the decreasing rate of the electromagnetic attractive force F that decreases with increasing stroke distance are in a trade-off relationship.

Hence, in the embodiment, a rubber-like resin binder with elasticity, which includes a resin material such as a high polymer, and a soft magnetic powder are kneaded to form a magnetic elastic admixture 21. The magnetic elastic admixture 21 that is provided in such a manner as to be always in contact with the mover 11 and a stator 1 of the electromagnetic solenoid A is clamped in the magnetic gap G between the mover 11 and the stator 1. In this manner, the characteristics of the electromagnetic force improves dramatically, and mechanical efficiency such as responsivity also improves due to the spring force of the magnetic elastic admixture 21.

The magnetic elastic admixture 21 is a soft magnetic elastic admixture that is prepared by kneading a resin binder with elasticity and a soft magnetic powder as mentioned above. The manufacturing process can also include the process of mixing the magnetic powder in a resin having a high degree of hardness after molding and a resin that exhibits elasticity after molding, and the process of two-color molding with the plurality of types of resin.

The manufacturing process is not limited to the above-mentioned process. As long as in the manufacturing process in which it is possible to mold a resin admixture that has soft magnetism and also exhibits elasticity after molding, any process or method can be employed.

Figure 4:
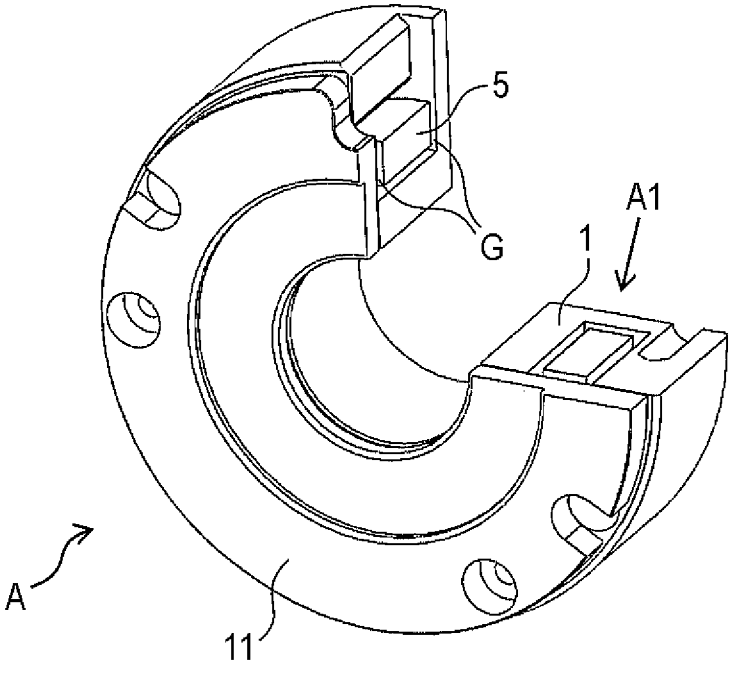
FIG. 4 is a perspective view (three-quarter section view) of the entire basic structure of the electromagnetic solenoid according to the embodiment as viewed from above.

A description is given in more detail below with reference to the drawings. FIG. 4 is a diagram illustrating the entire basic structure of the electromagnetic solenoid A according to the embodiment. The basic principle of the electromagnetic solenoid having the structure illustrated in FIG. 4 is the same as the electromagnetic solenoid illustrated in FIG. 1. However, the stator core 1 has an annular shape. The electromagnetic solenoid A includes the mover 11 (a movable plate) that similarly has an annular shape and also has a plate shape, and an annular coil 5 for generating a magnetic attractive force. Although not illustrated here, an elastic body may be provided separately to maintain the movable plate 11 that is released when the power to the coil 5 of the stator 1 is turned off, in the released state.

Figure 5:
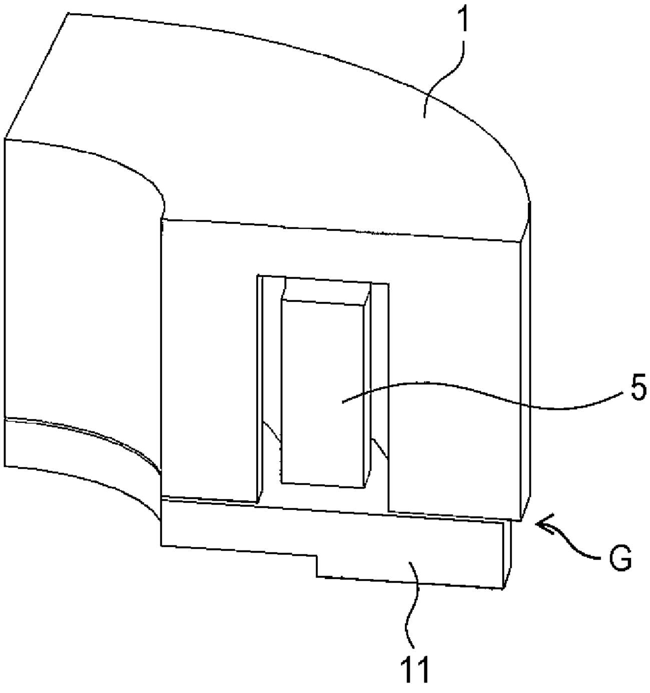
FIG. 5 is a perspective view (quarter section view) of a major part of the basic structure of the electromagnetic solenoid according to the embodiment.
Figure 6:
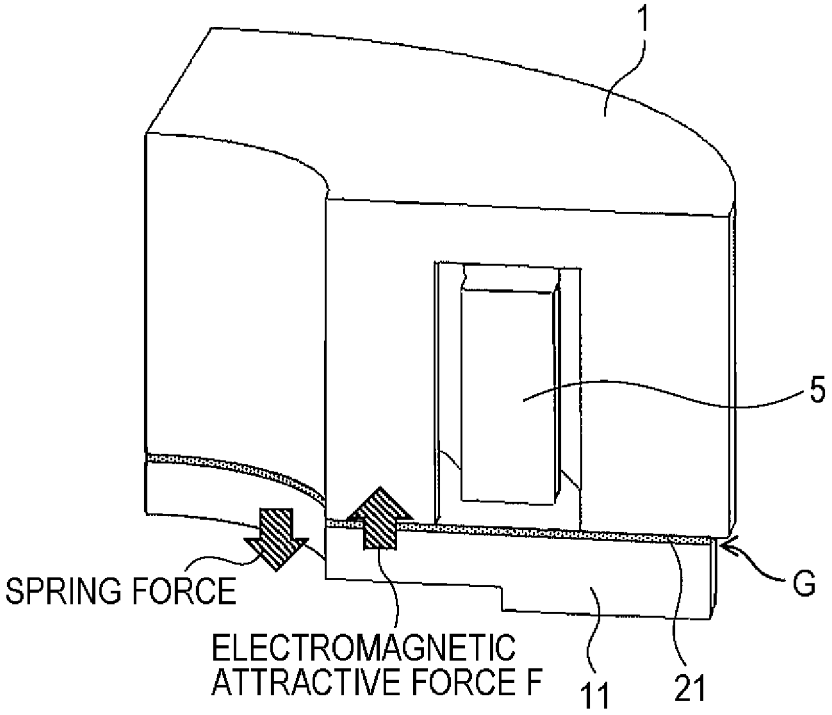
FIG. 6 is a perspective view (quarter section view) illustrating the details of the major part to which the electromagnetic solenoid according to the embodiment is applied.

FIG. 5 is a perspective view illustrating a cross section of a major part of the basic structure of the electromagnetic solenoid A in FIG. 4 as viewed in a direction of an arrow A1 (the details are omitted). As illustrated in FIG. 5, the magnetic gap G is created between the annular stator 1 and the annular movable plate 11. The movable plate 11 can reciprocate along an axis C pointing in a direction of the stator 1 in the space of the magnetic gap G. FIG. 6 illustrates the major part of the electromagnetic solenoid according to the embodiment, which has the basic structure. FIG. 6 is a perspective view of a cut-out portion in a quarter section view as viewed from the cross section as in FIG. 5. As illustrated in FIG. 6, in the embodiment, the above-mentioned magnetic elastic admixture 21 is provided, clamped and fixed in the magnetic gap G in FIG. 5.

The magnetic elastic admixture 21 is configured in such a manner as to deform elastically between a shortest stroke position and a longest stroke position in the electromagnetic solenoid A, and to be always in contact with a contact surface with the movable plate 11 and a contact surface with the stator 1 without being separated from the contact surfaces. When at the shortest stroke position, the mover 11 is being electromagnetically attracted toward the stator 1 during energization of the coil 5. The distal end of the mover 11 is closest to the stator 1 due to the electromagnetic attractive force F. In other words, the proximal end of the mover 11 is at the above-mentioned first proximal end position. On the other hand, when at the longest stroke position, the mover 11 is on a side opposite to the stator 1 after the coil 5 is de-energized and the mover 11 is electromagnetically released. The stator 1 and the movable plate 11 are farthest apart due to the biasing forces of the unillustrated elastic body and the magnetic elastic admixture 21. In other words, the proximal end of the mover 11 is at the second proximal end position. The magnetic elastic admixture 21 may be fixed to the contact surface with the movable plate 11 and the contact surface with the stator 1. Alternatively, the magnetic elastic admixture 21 may remain in contact with the contact surfaces due to the spring force without being separated from the contact surfaces. Therefore, there is no layer including only gas such as air in the magnetic gap G. Instead, there is a soft magnetic material in the magnetic gap G. Hence, it is possible to prevent a decrease in magnetic resistance at any stroke position where the distal end of the mover 11 is.

Figure 7:
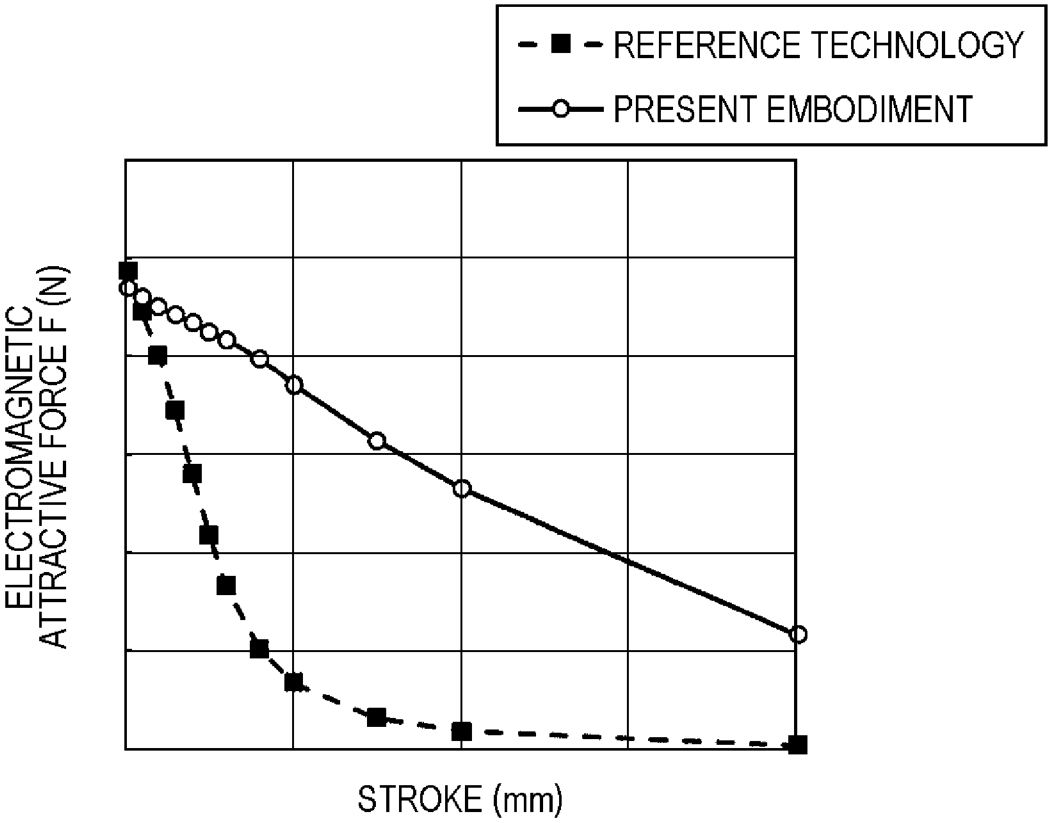
FIG. 7 is a schematic diagram illustrating the stroke dependence of the electromagnetic attractive force F of the electromagnetic solenoid according to the embodiment and a reference technology.

A simulation of the electromagnetic attractive force F was performed to analyze an electromagnetic field in the embodiment described above. FIG. 7 illustrates the stroke dependence of the electromagnetic attractive force F (a magnetic force (N) is used as an indicator here) of the electromagnetic solenoid A having the structure of FIG. 6.

A dotted line linking ■ in FIG. 7 indicates the stroke dependence of the standard electromagnetic solenoid X. In a case of the basic structure of the present disclosure in FIG. 4, that is, in a case of the standard electromagnetic solenoid technology, the characteristics of the electromagnetic attractive force represented by the dotted line are equivalent to the example where the magnetic gap forming shape of the mover (movable plate) 11 of the electromagnetic solenoid A is the flat shape in 3) in FIG. 2. The characteristics of the electromagnetic attractive force at this point in time are indicated by the curve in 3) in FIG. 3 as in the case where the magnetic gap forming shape is a flat shape as in 3) in FIG. 2. In other words, when the stroke distance is considerably short, the electromagnetic attractive force F is largest. On the other hand, as the stroke distance increases, the electromagnetic attractive force F decreases sharply and geometrically. When the stroke distance is sufficiently long, the electromagnetic attractive force F is considerably small.

However, the stroke dependence in a case where the electromagnetic solenoid A according to the embodiment is applied, which is indicated by a solid line linking o in FIG. 7, is different from the stroke dependence of the standard electromagnetic solenoid X. The electromagnetic attractive force F in a short stroke region is substantially equal to the electromagnetic attractive force F of the electromagnetic solenoid X. However, even if the stroke distance increases, the electromagnetic attractive force F does not decrease dramatically. In the above-mentioned electromagnetic solenoid in FIG. 3, the relationship with the electromagnetic attractive force F based on the stroke is dependent on the magnetic gap forming shape. The magnitude of the electromagnetic attractive force F at a short stroke distance, and the decreasing rate of the electromagnetic attractive force F that decreases with increasing stroke distance are in a trade-off relationship. However, in the case of the electromagnetic solenoid A, this relationship is broken. As a result, the magnetic performance is improved.

An additional advantage of the embodiment is in the generation of the spring force in the magnetic gap G where the magnetic elastic admixture 21 is clamped. For example, a coil spring, a Belleville washer, or a bulk elastic body is used to release the movable plate 11 when the power to the coil 5 of the electromagnetic solenoid A is turned off, and to maintain the released state. In the embodiment, the spring force of the clamped magnetic elastic admixture 21 can also be used as the biasing force for release and maintenance of the released state. Hence, it is possible to improve mechanical performance such as an improvement in responsivity on release.

Up to this point, as described in the specific embodiment, the electromagnetic solenoid according to the embodiment includes the stator, the mover, and the magnetic elastic admixture that can deform elastically, which is made of a resin material with soft magnetism and elasticity. The magnetic elastic admixture is clamped between the stator and the mover. The proximal end of the mover is located at the first proximal end position when the mover is electromagnetically attracted toward the stator during energization of the coil. On the other hand, the proximal end of the mover is located at the second proximal end position when the mover is electromagnetically released and moved to the side opposite to the stator during de-energization of the coil. The magnetic elastic admixture deforms elastically while the proximal end of the mover reciprocates between the first proximal end position and the second proximal end position, and is not separated from the contact surface with the mover and the contact surface with the stator. Moreover, the present disclosure discloses the method for manufacturing the electromagnetic solenoid A. As long as the electromagnetic solenoid and the method for manufacturing the same are realized, they are not limited to the above embodiment, and can be modified into a desired embodiment within the scope where the gist of the embodiment is not changed.

What is claimed is:

1. An electromagnetic solenoid comprising:

a stator including a stator core;

a coil configured to generate an electromagnetic attractive force by energizing the stator core;

a mover configured to be attracted toward the stator by the electromagnetic attractive force; and a magnetic elastic admixture including a resin material with soft magnetism and elasticity, wherein the mover is configured to reciprocate by being released by an elastic body that generates a biasing force in a direction opposite to a direction in which the electromagnetic attractive force acts, a proximal end of the mover is located at a first proximal end position upon the mover being electromagnetically attracted toward the stator during energization of the coil, and is located at a second proximal end position upon the mover being electromagnetically released and moved to a side opposite to the stator during de-energization of the coil, and the magnetic elastic admixture is configured to elastically deform between the mover and the stator and not to be separated from a contact surface with the mover and a contact surface with the stator.

2. The electromagnetic solenoid according to claim 1, wherein the magnetic elastic admixture includes a soft magnetic elastic admixture having a resin binder with elasticity and a soft magnetic powder, which are mixed or kneaded in a resin material.

3. The electromagnetic solenoid according to claim 1, wherein the stator has an annular shape, and the mover has an annular shape and also a plate shape.

4. The electromagnetic solenoid according to claim 1, wherein the elastic body that generates the biasing force includes a coil spring, a Belleville washer, or a bulk elastic material.

5. A method for manufacturing the electromagnetic solenoid according to claim 1, the method comprising forming a magnetic elastic admixture, wherein the forming of the magnetic elastic admixture includes:

mixing a magnetic powder in a resin with a high degree of hardness, and a rubber-like resin with a low degree of hardness; and two-color molding with the resins.

6. The method for manufacturing the electromagnetic solenoid according to claim 5, wherein the rubber-like resin with the low degree of hardness is a resin binder with elasticity, and the magnetic powder is a soft magnetic powder.

* * * * *